(12) United States Patent
Kurdziel et al.

(10) Patent No.: US 7,613,295 B2
(45) Date of Patent: Nov. 3, 2009

(54) CRYPTOGRAPHIC DEVICE AND ASSOCIATED METHODS

(75) Inventors: Michael Thomas Kurdziel, Rochester, NY (US); Gary Roger Dennis, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 961 days.

(21) Appl. No.: 10/780,848

(22) Filed: Feb. 18, 2004

(65) Prior Publication Data

US 2005/0180565 A1   Aug. 18, 2005

(51) Int. Cl.
*H04L 9/06* (2006.01)
(52) U.S. Cl. .......................................... 380/29; 380/37
(58) Field of Classification Search .................. 380/28, 380/29, 239, 265, 37; 713/150
See application file for complete search history.

(56) References Cited

U.S. PATENT DOCUMENTS

| | | | | |
|---|---|---|---|---|
| 5,103,479 | A |   | 4/1992 | Takaragi et al. ............... 380/28 |
| 5,365,588 | A |   | 11/1994 | Bianco et al. ................. 380/42 |
| 5,511,123 | A |   | 4/1996 | Adams ......................... 380/29 |
| 6,028,939 | A | * | 2/2000 | Yin .............................. 713/189 |
| 6,108,421 | A |   | 8/2000 | Kurdziel et al. ............... 380/28 |
| 6,185,679 | B1 |   | 2/2001 | Coppersmith et al. ........ 713/150 |
| 6,189,095 | B1 | * | 2/2001 | Coppersmith et al. ........ 713/150 |
| 6,451,593 | B1 |   | 9/2002 | Wittig et al. |
| 6,769,063 | B1 | * | 7/2004 | Kanda et al. ................. 713/193 |
| 6,937,727 | B2 | * | 8/2005 | Yup et al. ...................... 380/37 |
| 7,254,231 | B1 | * | 8/2007 | Van Dyke et al. ............. 380/29 |
| 2002/0118827 | A1 | * | 8/2002 | Luyster ........................ 380/37 |
| 2003/0068036 | A1 | * | 4/2003 | Macchetti et al. ............. 380/29 |
| 2003/0133568 | A1 | * | 7/2003 | Stein et al. .................... 380/37 |

FOREIGN PATENT DOCUMENTS

WO    WO 99/34831    7/1999

OTHER PUBLICATIONS

"Cryptography and Network Security: Principles and Practice", Stallings, 2003, Chapter 5, "The Advanced Encryption Standard", pp. 140-168.*
"AES proposal: Rijndael" Daemen et al. discloses the details of the Rijndael proposal, eventually accepted as the AES algorithm.*

(Continued)

*Primary Examiner*—Gilberto Barron, Jr.
*Assistant Examiner*—Abdulhakim Nobahar
(74) *Attorney, Agent, or Firm*—Allen, Dyer, Doppelt, MIlbrath & Gilchrist, P.A.

(57) ABSTRACT

A cryptographic device includes an input stage receiving an input data block and a key data block made up of a plurality of sub-key data blocks, and generating a plurality of first signals therefrom. An intermediate stage is connected to the input stage and includes a plurality of substitution units. Each substitution unit substitutes data within a respective first signal. A diffuser is connected to the plurality of substitution units for mixing data to generate a diffused signal. An output stage is connected to the intermediate stage for repetitively looping back the diffused signal to the input stage for combination with a next sub-key data block. The output stage provides an output signal for the cryptographic device after the repetitively looping back is complete.

23 Claims, 6 Drawing Sheets

OTHER PUBLICATIONS

Bongartz J-P. et al. "Improved biological activity of antisense oligonucleotides conjugated to a fusogenic peptide" Nucleic Acids Research 1994 vol. 22 No. 22 pp. 4681-4688.

Baodian et al., "Property of Finite Fields and its Cryptography Application", Electronic letters, IEE 2003, vol. 39, No. 8 dated Apr. 17, 2003; p. 655-656.

Biryukov et al.; "Structural Cryptanalysis of SASAS", Lecture Notes in Computer Science, Vo. 2045 dated May 10, 2001, p. 394-405, Publication No. XP002322523, ISBN: 3-540-42070-3.

Daemen et al., "Linear Frameworks for Block Ciphers", Published by Design Codes and Cryptography, Kluwer Academic Publishers, Boston; vol. 22, No. 1 dated Jan. 2001; p. 65-87; XP-002322522 Netherlands; ISSN: 0925-1022.

Kurdziel et al., Baseline Requirements for Government and Military Encryption Algorithms, IEEE Military Communications Conference, Oct. 10, 2002, Anaheim, California.

* cited by examiner

CRYPTOGRAPHIC DEVICE AND ASSOCIATED METHODS

GOVERNMENT LICENSE RIGHTS

The U.S. Government has a paid-up license in this invention and the right in limited circumstances to require the patent owner to license others on reasonable terms as provided for by the terms of contract No. MDA904-99-C-6511, awarded by the U.S. Government.

FIELD OF THE INVENTION

The present invention relates to the field of cryptography, and more particularly, to cryptographic algorithms, such as the advanced encryption standard (AES) algorithm.

BACKGROUND OF THE INVENTION

The new advanced encryption standard (AES) algorithm was designed for commercial applications. As per its original specification, the AES algorithm runs efficiently in both hardware and software. This requirement not only increases the probability of a software-based brute force success, but also imposes a mathematical structure that may shrink the search space of the attack.

AES was formerly known as Rijndael and is the U.S. Government's new type-3 algorithm. The algorithm is cryptographically strong, and is efficient in both hardware and software embodiments. The algorithm features a scalable key length. This attribute, together with other advantages, ensures that the AES algorithm will be effective for commercial applications for many years.

A complete description of the AES algorithm can be found in the Federal Information Processing Standard (FIPS-197). For the AES algorithm to run efficiently in software, it was constructed with multiple rounds (or loops) of arithmetic functions that operate on byte-sized or 32 bit word-sized variables over $GF(2^8)$ and $GF(2)$. Operations over these two Galois Fields results in algorithm behavior that is highly non-linear. Each round includes a substitution operation, a row shift operation, a column mixing operation, and an addition operation for combining a sub-key variable addition operation.

The substitution operation includes a non-linear byte substitution that operates independently on each byte of the 128 bit input to this stage. The substitution includes a series of linear operations over both $GF(2^8)$ and $GF(2)$. The relationship between operations over these two fields results in an overall mapping that is non-linear. This property provides strength against linear and differential cryptanalysis.

Following the substitution operation is a straightforward row-wise byte shifting operation. Next, a column-wise polynomial transformation is applied if a count indicates that the total number of rounds has not been completed yet. The transformation includes a third order polynomial multiplication over $GF(2^8)$. The row shifting and column transformation operations provide mixing or diffusion layers to the algorithm. Finally, a key variable addition operation is performed. This operation is a straightforward modulo-two addition of an input variable with the appropriate sub-key variable over $GF(2)$.

The row shifting and column transformation operations provide layers of diffusion for the AES algorithm. However, there is no redundancy in the AES diffusion layers. The algorithm's cryptographic strength depends on the mixing offered by the diffusion layer operations working together over multiple rounds. If an attack is identified that eliminates the contribution of any of these operations, the overall cryptographic strength of the algorithm will be compromised.

SUMMARY OF THE INVENTION

In view of the foregoing background, it is therefore an object of the present invention to enhance the cryptographic strength of a cryptographic algorithm, such as the advanced encryption standard (AES) algorithm, for example.

This and other objects, features and advantages in accordance with the present invention are provided by a cryptographic device comprising an input stage, an intermediate stage and an output stage. The input stage may receive an input data block and a key data block comprising a plurality of sub-key data blocks, and generates a plurality of first signals therefrom. The intermediate stage may be connected to the input stage and may comprise a plurality of substitution units, with each substitution unit substituting data within a respective first signal. A diffuser may be connected to the plurality of substitution units for mixing data to generate a diffused signal.

The output stage may be connected to the intermediate stage for repetitively looping back the diffused signal to the input stage for combination with a next sub-key data block. The output stage may provide an output signal for the cryptographic device after the repetitively looping back is complete. The output signal may be further combined with a final sub-key data block.

The cryptographic strength of the algorithm is advantageously increased because of the added diffusion layer associated with the plurality of substitution units and the diffuser connected thereto. Each substitution unit may perform a non-linear substitution based upon a look-up table. The diffuser may comprise a shift register and a look-up table associated therewith for mixing the data. Alternately, the diffuser may comprise a plurality of shift registers and a plurality of look-up tables associated therewith for mixing the data.

The output stage may also perform a row-shift operation on the diffused output signal before being looped back to the input stage. Likewise, the output stage may also perform a column-mix operation on the diffused output signal being looped back to the input stage. The output stage may further comprise a counter for counting a number of times the diffused output signal is looped back to the input stage.

Another aspect of the present invention is directed to a communication system comprising a key scheduler providing the key data block, and a cryptographic device connected thereto as defined above. The key scheduler and cryptographic device may be formed as part of an application specific integrated circuit (ASIC), for example.

Yet another aspect of the present invention is directed to a method for converting an input data block into an output signal for a cryptographic device. The method may comprise generating a plurality of first signals based upon the input data block and a key data block comprising a plurality of sub-key data blocks, and substituting data within each first signal using a respective substitution unit. The method may further comprise mixing data to generate a diffused signal using a diffuser connected to the respective substitution units, and repetitively looping back the diffused signal for combination with a next sub-key data block before repeating the substituting and mixing. An output signal for the cryptographic device is provided after the repetitively looping back is complete.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notations are used to indicate similar elements in alternative embodiments.

Figure 1:
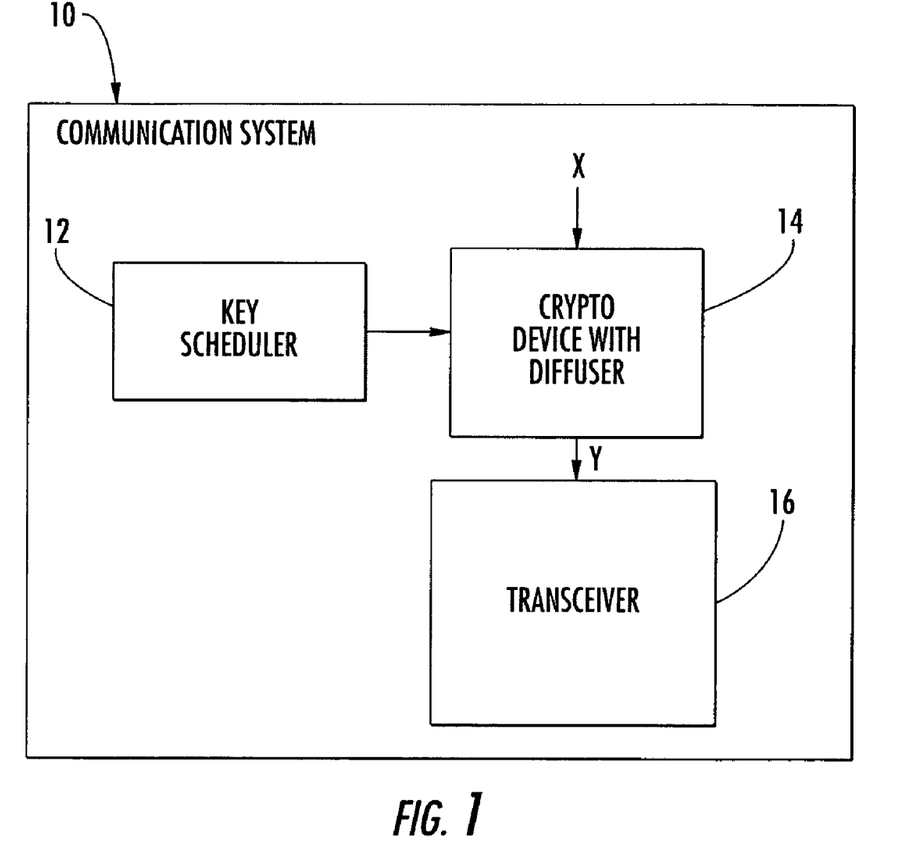
FIG. 1 is a block diagram of a communication system including a key scheduler and a cryptographic device in accordance with the present invention.

Referring initially to FIG. 1, a secure communication system 10 comprises a key scheduler 12, a cryptographic device 14 and a transceiver 16. The key scheduler 12 provides a key data block to the cryptographic device 14. The cryptographic device 14 provides an output signal Y to the transceiver 16 based upon a received input data block X and the key data block from the key scheduler 12. The key scheduler 12 and the cryptographic device 14 may be formed as separate units, or they may be part of an application specific integrated circuit (ASIC), for example.

The cryptographic device 14 executes an algorithm that has enhanced cryptographic strength so that it is suitable for secure communication systems. The algorithm may be a modified advanced encryption standard (AES) algorithm, for example.

Figure 2:
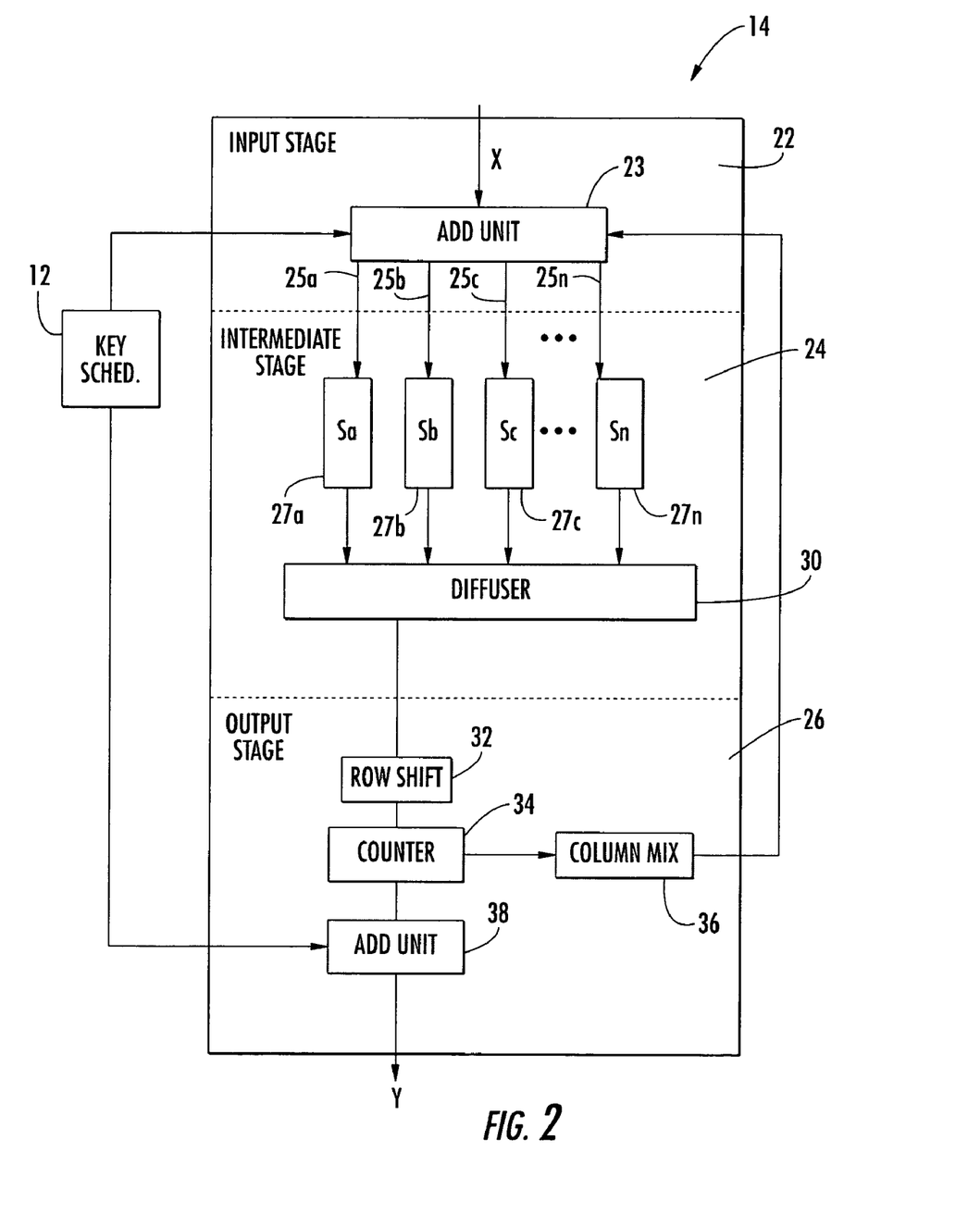
FIG. 2 is detailed block diagram of the cryptographic device as shown in FIG. 1.
Figure 3:
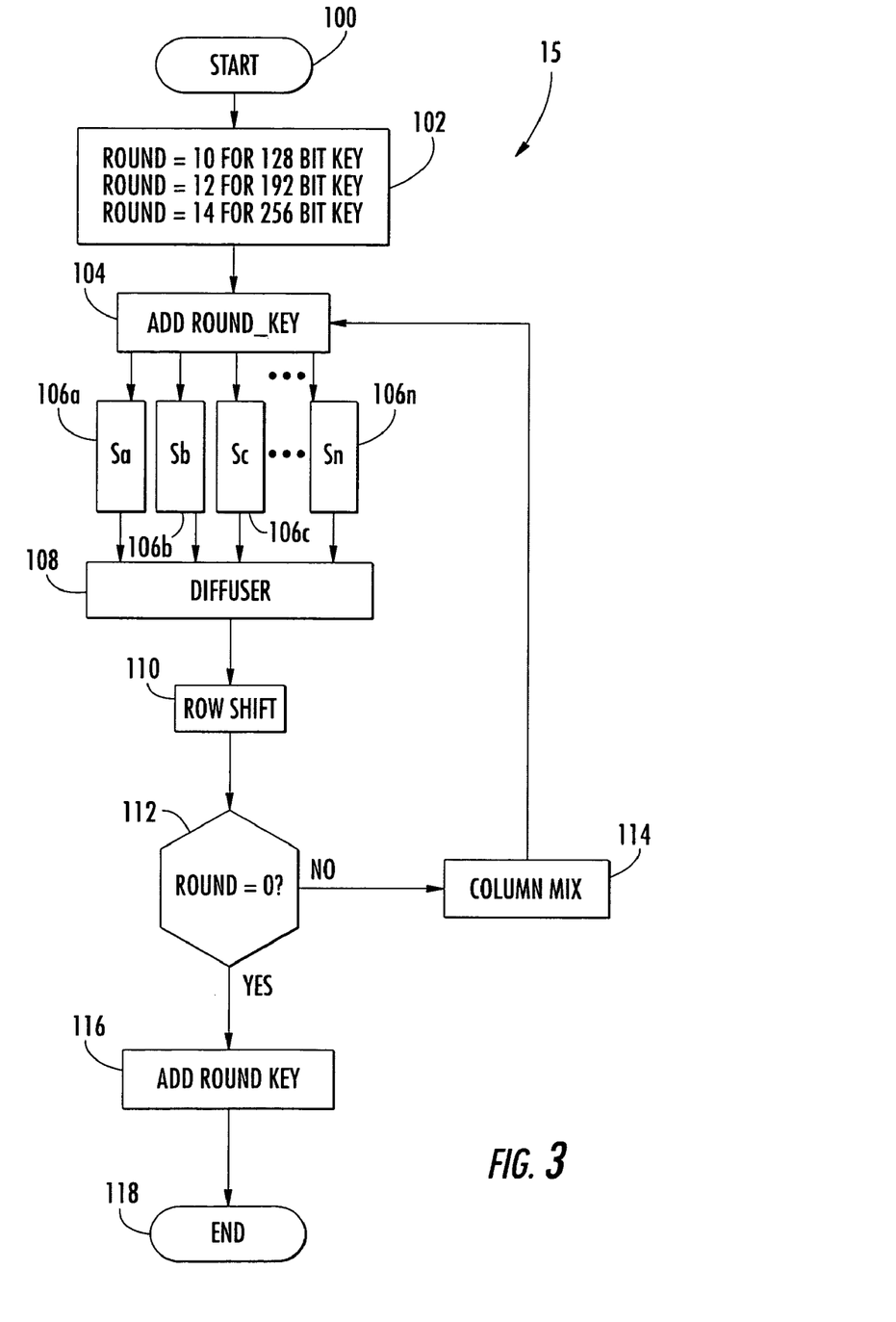
FIG. 3 is flowchart of the cryptographic algorithm being executed by the cryptographic device as shown in FIG. 1.

The algorithm in accordance with the present invention will now be discussed with reference to the cryptographic device 14 as shown in FIG. 1, and to a generalized flow diagram 15 as shown in FIG. 2. The cryptographic device 14 may comprise an input stage 22, an intermediate stage 24 and an output stage 26.

The input stage 22 receives the input data block X (Block 100), and the key data block (Block 102) from the key scheduler 12. The key data block comprises a plurality of sub-key data blocks as readily understood by those skilled in the art. Each sub-key data block may be referred to as a round key. In the case of the AES algorithm, a 128 bit key data block, there are 10 sub-key data blocks, for a 192 bit key data block there are 12 sub-key data blocks, and for a 256 bit key data block there are 14 sub-key data blocks as shown in Block 102.

In the input stage 22, the input data block X and a first sub-key data block are added together using a modulo-two unit 23 (Block 104). In accordance with the present invention, the output signal from the modulo-two unit 23 (Block 104) is divided into a plurality of first signals $25a$-$25n$. For example, if the input data block X has a length of 128 bits, the output signal may be divided into 8 bit (1 byte) lengths resulting in n being equal to 16. The first signals may also be generally represented by reference 25. Of course the size of the input data block X and the number n of first signals may vary depending on the intended application.

The intermediate stage 24 is connected to the input stage 22 and comprises a plurality of substitution units $27a$-$27n$. (Blocks $106a$-$106n$) The substitution units may also be generally represented by reference 27. There is a respective substitution unit 27 for each first signal 25. The intermediate stage 24 may also comprise a diffuser 30 (Block 108) connected to the plurality of substitution units $27a$-$27n$ for mixing data to generate a diffused signal. In the case of the AES algorithm, the plurality of substitution units $27a$-$27n$ and the diffuser 30 add redundancy to the existing diffusion layers. In other words, if an attack is identified that eliminates the contribution of any of these operations, the overall cryptographic strength of the algorithm will not be compromised.

Using the AES algorithm as an example, the output stage 26 is connected to the intermediate stage 24 for repetitively looping back the diffused signal to the input stage 22 for combination with a next sub-key data block. However, before the diffused signal is looped back, it is passed through a row shift unit 32 (Block 110). A counter 34 (Block 112) counts how many times the repetitive loop has been performed. If another repetitive loop is to be performed, the signal from the row shift unit 32 is provided to a column mix unit 36 (Block 114).

The signal from the column mix unit 36 is fed back to the modulo-two add unit 23 (Block 104), wherein the looped back signal is added with a next sub-key data block. This repetitive looping back continues until the counter 34 reaches a predetermined count. When the predetermined count has been reached, the signal is then passed to another modulo-two add unit 38 so that a final sub-key data block can be added (Block 116) to the output signal. The signal from the modulo-two add unit 38 provides the output signal for the cryptographic device 14 after the repetitively looping back is complete (Block 118).

The modifications providing an enhanced cryptographic strength will now be discussed in greater detail. Instead of a single substitution unit, there are a plurality of substitution units $27a$-$27n$. The plurality of substitution units $27a$-$27n$ substitute data within the plurality of first signals $25a$-$25n$ which may be based upon random permutations or mathematical formulae.

Following the substitutions by the plurality of substitution units $27a$-$27n$ may be a diffuser function. The diffuser function is chosen such that it cannot be specified over $GF(2^8)$ and runs relatively slow in software. A range of functions is possible so programmable or customer specific requirements can be satisfied. These customized functions can be retained as proprietary information to prevent proliferation of the resulting algorithm.

The substitution unit in the AES algorithm, for example, is based on a function that provides optimal security against linear and differential cryptanalysis. The issue is that it also allows an over-defined quadratic representation for the algorithm to be specified over $GF(2^8)$. This is a potential cryptographic vulnerability.

Rather than using the mapping specified in the AES standard, the plurality of substitution units 27a-27n are comprised of programmable functions. Since there are 16 substitution units in the illustrated embodiment, the entropy preserving random permutations associated therewith eliminate the possibility of any mathematical model existing over a single field.

The following criteria should be addressed in providing a plurality of substitution units 27a-27n. Meeting these criteria results in a mapping that should be secure against known linear and differential cryptanalysis: 1) each differential characteristic has a probability of at most ¼, and a one-bit input difference will not lead to a one-bit output difference; 2) each linear characteristic has a probability in the range ½±¼, and a linear relation between one single bit in the input and one single bit in the output has a probability in the range ½±⅛; and 3) the nonlinear order of the output bits as a function of the input bits is the maximum, namely 3. Simulations have shown that of the approximately $10^{500}$ possible mappings, in excess of $10^{400}$ of these will meet the above criteria.

The configuration of the diffuser 30 is governed primarily by the need to add computational complexity to the algorithm so that the speed of a software embedment is impacted. However, rather than use a cryptographically benign function, an operation that provides enhanced mixing to the algorithm is used.

Of all of the possible embodiments for the diffuser 30, three are discussed below with reference to FIGS. 4, 5 and 6. In one embodiment, the diffuser 30 comprises a shift register 60 and a look-up table 62. The minimum number of cycles that the diffuser 30 circulates is enough to provide bit-wise mixing across the entire shift register. It is entropy preserving to eliminate the possibility of collisions occurring. The diffuser function is composed of a random mapping 62, a shift register 60 and a modulo-two add unit 64. The input variable is first entered into the shift register 60. The register 60 is then shifted to the right one bit at a time until its contents have been completely re-circulated. With each shift, the least significant bit is modulo-two added to the output of the look-up table 62. The result is moved into the most significant bit position of the register 60. When the contents of the register 60 have been completely processed, an output is generated.

The look-up table 62 is a custom non-linear function that maps at least 6 one-bit inputs to a single one-bit output. Each of the inputs is a tap connected to an individual bit position in the register 60. The tap locations can be arbitrarily chosen with the constraint that no tap can be connected to either the least significant or to the most significant bit positions on the shift register 60.

The look-up table 62 is a uniformly distributed mapping with the all zeros input location mapped to one and the all ones input location mapped to zero. This constraint prevents the diffuser 30 from locking up for certain values of the input. Note also that the processing time of power consumption of the function does not change depending on the structure of the input or output. It therefore preserves the security of the algorithm. Custom mapping designs can also be held as proprietary information to prevent proliferation of the resulting algorithm.

Figures 4, 5:
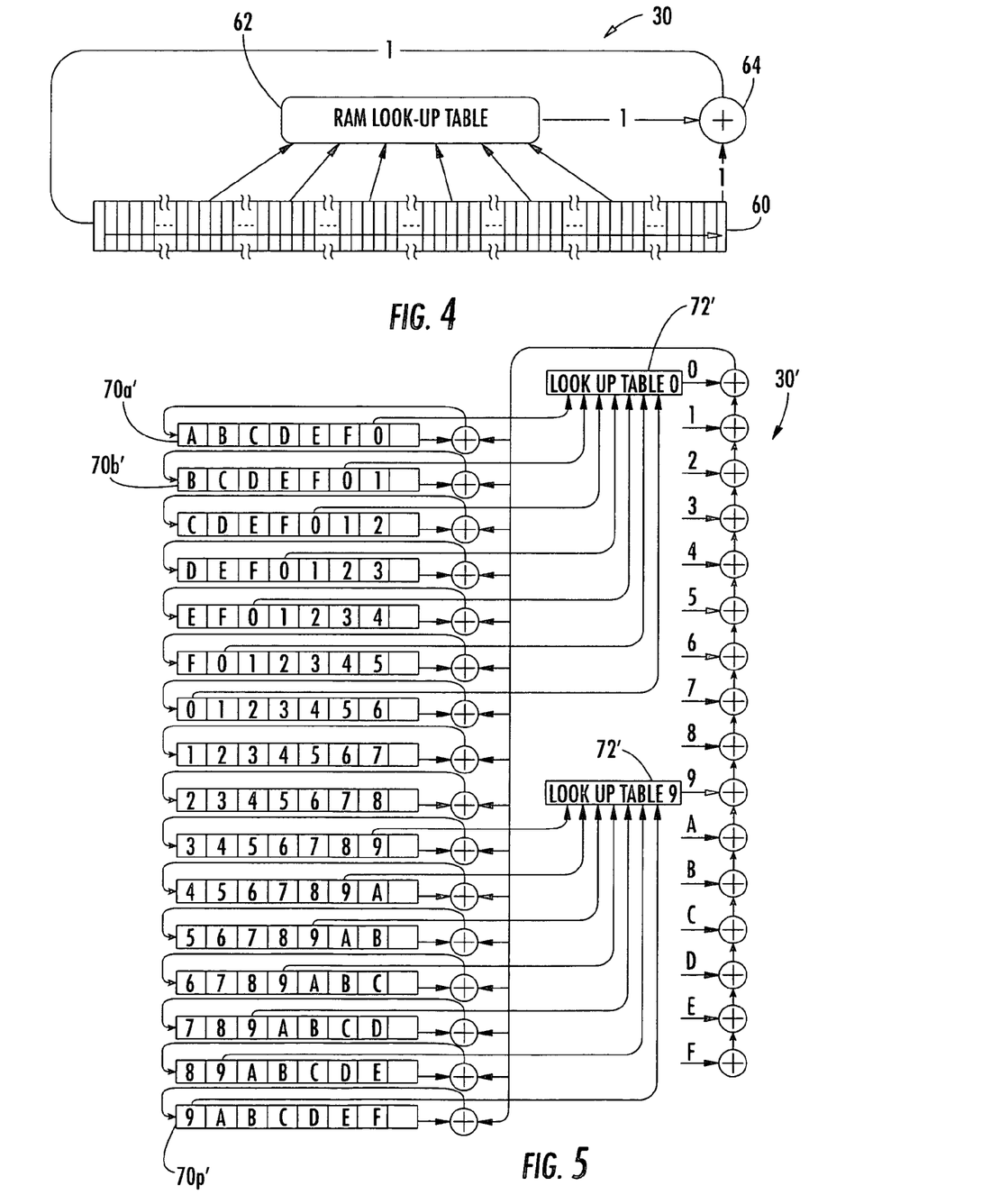
FIG. 4 is one embodiment of the diffuser as shown in FIG. 2.
FIG. 5 is a second embodiment of the diffuser as shown in FIG. 2.

As examples, variations of the 1×128 diffuser 30 as shown in FIG. 4 will now be discussed with reference to FIGS. 5 and 6. These embodiments 30', 30" provide similar statistical mixing performance, but are designed using parallel structures that execute faster in hardware than the 1×128 diffuser 30.

FIG. 5 illustrates a diffuser 30' constructed using a parallel array of 16 registers 70a'-70n' and 16 look up tables 72a'-72n' (two of which are only shown). Each register 70a'-70n' is 8 bits wide. This design provides mixing over a full 128 bit block size. However, the mixing occurs on 8 bit segments of the input block in parallel. This allows a significant increase in the performance for a hardware embedment without creating a corresponding increase in speed for a software embedment. As with the previous design, each look-up table 72a'-72n' is a uniformly distributed mapping with the all zeros input location mapped to one and the all ones input location mapped to zero.

Figure 6:
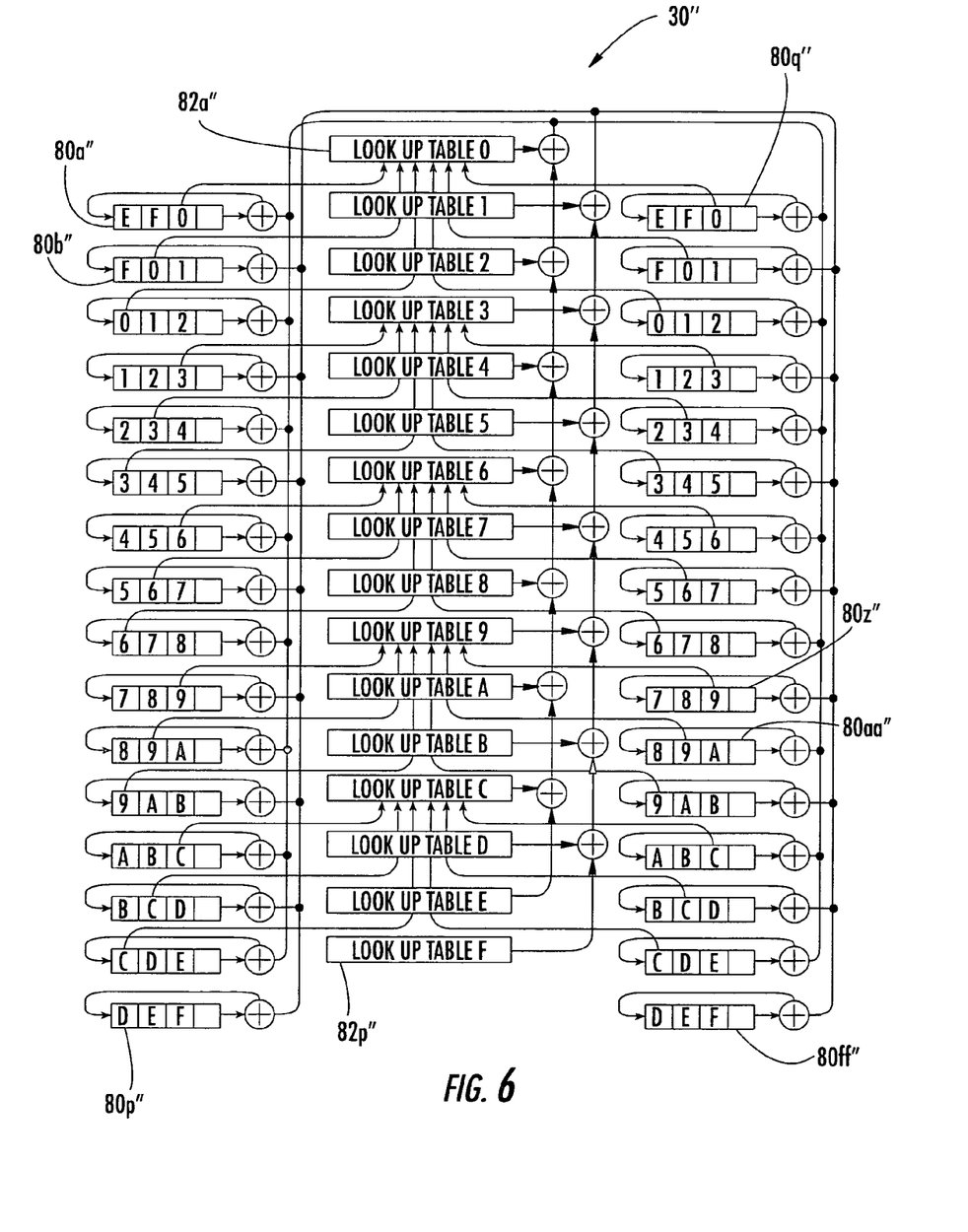
FIG. 6 is a third embodiment of the diffuser as shown in FIG. 2.

FIG. 6 illustrates a diffuser 30" constructed using a parallel array of 32 registers 80a"-80ff" and 16 look up tables 82a"-82p". Here, the mixing occurs on 4 bit segments of the input block in parallel and again, each look-up table 82a"-82p" is a uniformly distributed mapping with the all zeros input location mapped to one and the all ones input location mapped to zero.

Yet another aspect of the present invention is directed to a method for converting an input data block X into an output signal Y for a cryptographic device 14. Referring now to the flow diagram 17 in FIG. 7, from the start (Block 140), the method comprises generating a plurality of first signals 25a-25n based upon the input data block X and a key data block comprising a plurality of sub-key data blocks at Block 142. Data is substituted within each first signal using a respective substitution unit 27 at Block 144.

Figure 7:
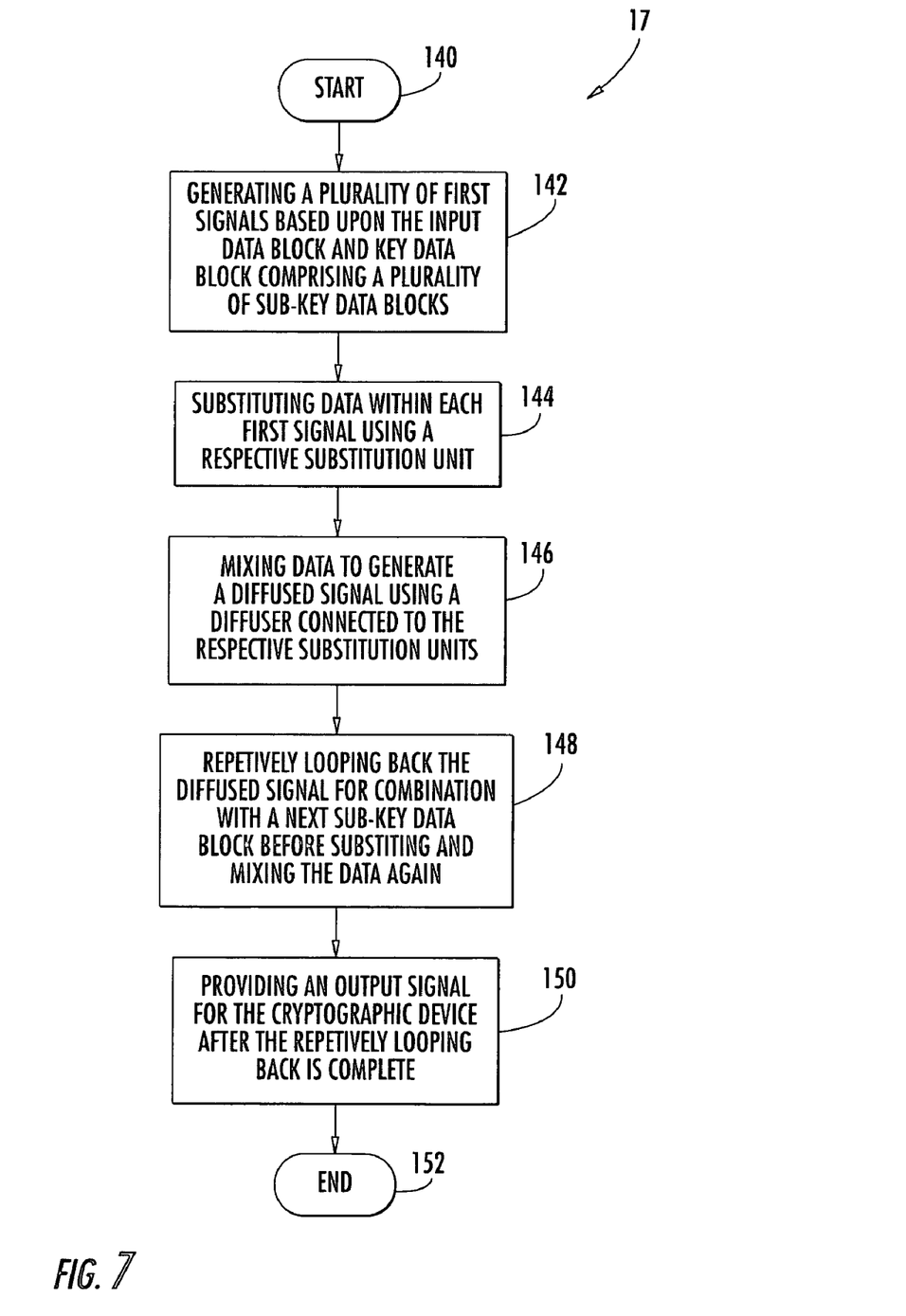
FIG. 7 is a method for converting an input data block into an output data block for a cryptographic device in accordance with the present invention.

The method further comprises mixing data to generate a diffused signal using a diffuser 30 connected to the respective substitution units 27a-27n, and repetitively looping back the diffused signal for combination with a next sub-key data block before repeating the substituting and mixing. The looping back is repeated a predetermined number of times, and the method further comprises providing the output signal for the cryptographic device 14 after the repetitively looping back is complete at Block 150. The method ends at Block 152.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A cryptographic device comprising:
   an input stage receiving an input data block that is X bits in length and a key data block comprising a plurality of sub-key data blocks, said input stage adding the X bits of the input data block with a first sub-key data block to generate a summed signal that is X bits in length, and then dividing the summed signal into N first signals that are in parallel, where each first signal is n bits in length so that n*N=X;
   an intermediate stage connected to said input stage and comprising
      a plurality of substitution units operating in parallel, each substituting data within a respective first signal, and
      a diffuser connected to said plurality of substitution units for mixing data to generate a diffused signal, said diffuser comprising at least one shift register and at least one look-up table associated therewith; and
   an output stage connected to said intermediate stage for repetitively looping back the diffused signal to said input stage for combination with a next sub-key data block.

2. A cryptographic device according to claim 1 wherein the looping back is repeated a predetermined number of times;

and wherein said output stage provides an output signal for the cryptographic device after the repetitively looping back is complete.

3. A cryptographic device according to claim 2 wherein the output signal is further combined with a final sub-key data block.

4. A cryptographic device according to claim 1 wherein each substitution unit performs a nonlinear substitution based upon at least one look-up table.

5. A cryptographic device according to claim 1 wherein said at least one shift register comprises a plurality of shift registers and said at least one look-up table comprises a plurality of lookup tables associated therewith.

6. A cryptographic device according to claim 1 wherein said output stage performs a row-shift operation on the diffused output signal before being looped back to said input stage.

7. A cryptographic device according to claim 1 wherein said output stage performs a column-mix operation on the diffused output signal being looped back to said input stage.

8. A cryptographic device according to claim 1 wherein said output stage comprises a counter for counting a number of times the diffused output signal is looped back to said input stage.

9. A communication system comprising:
a key scheduler providing a key data block comprising a plurality of sub-key data blocks; and
a cryptographic device connected to said key scheduler and comprising
an input stage receiving an input data block that is X bits in length and the key data block, said input stage adding the X bits of the input data block with a first sub-key data block to generate a summed signal that is X bits in length, and then dividing the summed signal into N first signals that are in parallel, where each first signal is n bits in length so that n*N=X;
an intermediate stage connected to said input stage and comprising
a plurality of substitution units operating in parallel, each substituting data within a respective first signal, and
a diffuser connected to said plurality of substitution units for mixing data to generate a diffused signal, said diffuser comprising at least one shift register and at least one lookup table associated therewith, and
an output stage connected to said intermediate stage for repetitively looping back the diffused signal to said input stage for combination with a next sub-key data block, said output stage providing an output signal for the cryptographic device after the repetitively looping back is complete.

10. A communication system according to claim 9 wherein the output signal is further combined with a final sub-key data block.

11. A communication system according to claim 9 wherein each substitution unit performs a non-linear substitution based upon at least one lookup table.

12. A communication system according to claim 9 wherein said at least one shift register comprises a plurality of shift registers and said at least one look-up table comprises a plurality of look-up tables associated therewith.

13. A communication system according to claim 9 wherein said output stage performs a row-shift operation on the diffused output signal before being looped back to said input stage.

14. A communication system according to claim 9 wherein said output stage performs a column-mix operation on the diffused output signal being looped back to said input stage.

15. A communication system according to claim 9 wherein said output stage comprises a counter for counting a number of times the diffused output signal is looped back to said input stage.

16. A method for converting an input data block that is X bits in length and a key data block comprising a plurality of sub-key data blocks into an output signal in a cryptographic device, the method comprising:
adding the X bits of the input data block with a first sub-key data block to generate a summed signal that is X bits in length, and then dividing the summed signal into N first signals that are in parallel, where each first signal is n bits in length so that n*N=X;
substituting data within each first signal using a respective substitution unit, with the substitution units operating in parallel to one another;
mixing data to generate a diffused signal using a diffuser connected to the respective substitution units, the diffuser comprising at least one shift register and at least one lookup table associated therewith; and
repetitively looping back the diffused signal for combination with a next sub-key data block before repeating the substituting and mixing.

17. A method according to claim 16 wherein the looping back is repeated a predetermined number of times; and further comprising providing an output signal for the cryptographic device after the repetitively looping back is complete.

18. A method according to claim 17 further comprising combining the output signal with a final sub-key data block.

19. A method according to claim 16 wherein each substitution unit performs a nonlinear substitution based upon at least one lookup table.

20. A method according to claim 16 wherein the at least one shift register comprises a plurality of shift registers and the at least one look-up table comprises a plurality of lookup tables associated therewith.

21. A method according to claim 16 further comprising performing a row-shift operation on the diffused output signal before being looped back.

22. A method according to claim 16 further comprising performing a column-mix operation on the diffused output signal being looped back.

23. A method according to claim 16 further comprising counting a number of times the diffused output signal is looped back.

* * * * *